No. 648,144. Patented Apr. 24, 1900.
R. N. CHAMBERLAIN.
ELECTRIC LIGHTING APPARATUS.
(Application filed Nov. 20, 1899.)
(No Model.)
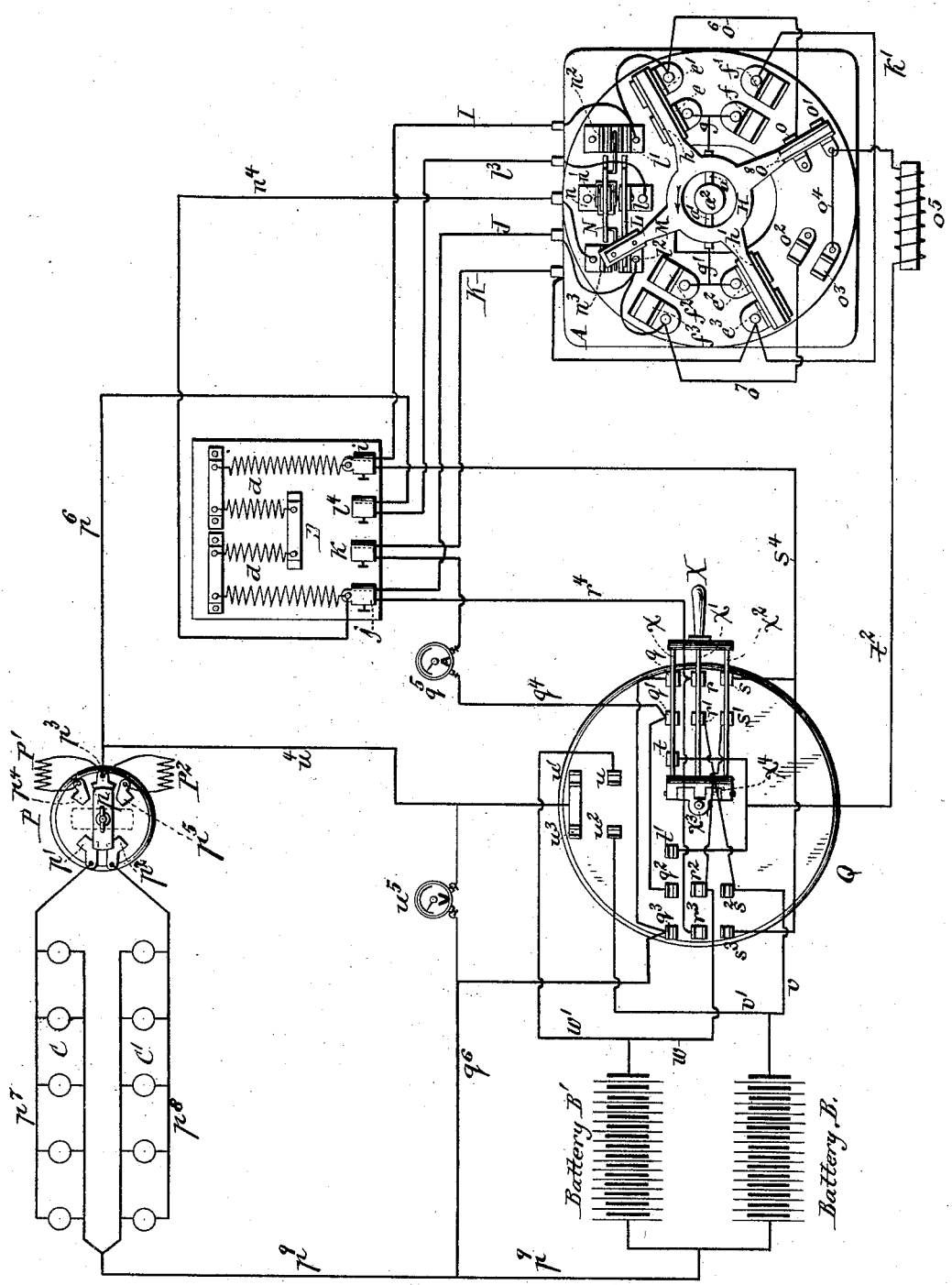
Witnesses:
F. F. Scherzinger.
Henry L. Dick.
R. N. Chamberlain, Inventor.
By Wilhelm Bonner,
Attorneys.

UNITED STATES PATENT OFFICE.

RUFUS N. CHAMBERLAIN, OF DEPEW, NEW YORK, ASSIGNOR TO CHARLES M. GOULD, OF NEW YORK, N. Y.

ELECTRIC-LIGHTING APPARATUS.

SPECIFICATION forming part of Letters Patent No. 648,144, dated April 24, 1900.

Application filed November 20, 1899. Serial No. 737,554. (No model.)

*To all whom it may concern:*

Be it known that I, RUFUS N. CHAMBERLAIN, a citizen of the United States, residing at Depew, in the county of Erie and State of New York, have invented new and useful Improvements in Electric-Lighting Apparatus, of which the following is a specification.

This invention relates to an electric-lighting apparatus for railroad-cars which embodies a dynamo driven from one of the car-axles and two storage batteries. The dynamo is provided with an automatic current-reversing mechanism, whereby the current is reversed when the rotation of the dynamo is reversed, and also with an automatic switch which automatically alternates the connections between the storage batteries and the charging and service circuits upon the reversal of the rotation of the dynamo. A lighting apparatus of this character is described and shown in Letters Patent No. 617,121, granted to Preston and Gill January 3, 1899, to which reference is made for a more complete description thereof.

The principal object of this invention is to provide convenient means for reversing by hand the relative working conditions of the two sets of batteries and to open the main circuit between the batteries and the generating apparatus and connect at the same time both batteries in multiple directly with the lighting-circuit in case of any disarrangement of the generating apparatus; also, to open the field-circuit of the generator when the battery-dynamo circuit is opened.

When a car provided with a lighting apparatus of this character has run in one direction so long that there is danger of one battery being entirely discharged while the other battery is overcharged, which is liable to happen with private cars, observation-cars, and other cars which generally run in the same direction, it becomes necessary to reverse the relative working conditions of the two batteries by hand from time to time. When the dynamo ceases to generate through some accident or disarrangement—for instance, by the driving-belt becoming loose—there is danger of the batteries short-circuiting through the armature or connections, thus putting the system out of operation. To avoid this danger, I provide means for connecting the batteries in multiple, without any intervening resistance, with the lighting-circuit at the same time that the circuit between the generator and the light and batteries is opened. Upon disconnecting the generating-circuit from the battery and lighting circuits the dynamo is left in an unsafe condition, because ordinarily the field-circuit is closed directly across the armature-poles. If the dynamo should begin to generate again through the residual and electromagnetism in the dynamo-frame, the field magnetism would increase to a dangerous point, raising the voltage greatly above the normal, because there is no load on the shunt-wound dynamo to keep the speed down and to cause armature reaction on the field. This increased voltage would greatly overload the field-wires and cause burned-out field-coils, which in turn would by their heat unsolder the binding-wires of the armature. The binding-wires thus loosened would permit the armature-wires to spread and be torn apart by the field-poles. This danger is avoided by opening the field-circuit whenever the main circuit is opened, because this prevents the field from becoming electromagnetized.

Another object of my invention is to provide a compensating resistance in the lighting-circuit, which resistance takes up the extra voltage when only part of the lights are in circuit, thus preventing an excessive supply of current to the lights which remain in circuit through the increased voltage due to the less drop in voltage in the main resistance.

The accompanying drawing is a diagrammatic view of a lighting apparatus embodying my improvements.

A represents the switchboard of a dynamo or electric generator; B B', two storage batteries; C C', two groups or sets of electric lamps or other translating devices, and D a resistance-board, on which the resistance coils or members $d$ are arranged. The armature of the dynamo is driven from one of the car-axles, and its brushes $a\,a'$ engage with the commutator $a^2$, so as to permit of turning the latter in either direction. In order to permit of the reversal of the movement of the armature without changing the direction or polarity of the current, a suitable automatic pole-reversing device is employed, that shown in the drawing being substantially the same as that which is shown and described in Letters Patent No. 602,182, dated April 12, 1898, and No. 617,121, dated January 3, 1899, both granted to E J. Preston and A. B. Gill. This reversing device, briefly stated, is constructed as follows:

$e\ e'$ and $e^2\ e^3$ represent two pairs of main contacts arranged on diametrically-opposite sides of the switchboard, and $f\ f'$ and $f^2\ f^3$ represent two similar pairs of main contacts arranged on diametrically-opposite sides of the switchboard at an angle to the first-mentioned pairs of contacts. The contacts $e\ f$ on one side of the switchboard are connected by wires $g$ with each other and with the adjacent brush $a$, and the contacts $e^3\ f^2$ on the opposite side of the switchboard are connected by wires $g'$ with each other and with the other brush $a'$.

H represents the contact or pole-reversing lever supported on the shaft of the armature and provided with two insulated blades $h\ h'$. When the armature is turning in one direction, the blade $h$ connects the contacts $e\ e'$ and the blade $h'$ connects the contacts $e^2\ e^3$, as shown in the drawing. When the armature turns in the opposite direction, the lever is reversed and its blade $h$ connects the contacts $f\ f'$ and its blade $h'$ the contacts $f^2\ f^3$.

I represents one of the main outgoing or positive wires, which is connected at one end with the contact $e'$ and at its opposite end to a binding-post $i$, arranged at one end of the resistance. J represents the other main outgoing or positive wire, which is connected at one end to the contact $f^3$ and at its opposite end to a binding-post $j$ at the opposite end of the resistance.

K represents a part of the main return or negative wire, which is connected at one end to a binding-post $k$ on the resistance-board and at its opposite end to the contact $e^3$ and by a branch wire $k'$ with the contact $f'$.

L represents an automatic battery-reversing switch-lever, which is pivoted on a post $l$, mounted on the dynamo-switchboard and adapted to engage its arms alternately with contacts $l'\ l^2$. The contact $l'$ is included in the main wire I and the contact $l^2$ in the main wire J.

$l^3$ is a wire which connects the pivot-post $l$ with a binding-post $l^4$ on the resistance-board.

M represents an insulated presser-arm which is arranged on one side of the pole-reversing lever H and which is adapted to engage either end of the battery-reversing lever L and turn the same into engagement with either the contact $l'$ or $l^2$.

N represents a resistance switch-lever arranged adjacent to the presser-arm of the dynamo contact-lever parallel with the battery-reversing lever L and pivoted on a post $n$, arranged on the dynamo-switchboard. This resistance switch-lever is normally turned by a spring $n'$ of any suitable construction into such a position that its ends simultaneously engage with two contacts $n^2\ n^3$, arranged on the dynamo-switchboard. The contact $n^3$ is connected by a wire $n^4$ with the binding-post $j$.

$o\ o'$ and $o^2\ o^3$ represent two pairs of field-contacts arranged on the dynamo-switchboard. The contacts $o'\ o^3$ of both pairs are connected by a wire $o^4$ with one side of the field-magnet coils $o^5$. The field-contact $o$ is connected by a wire $o^6$ with the contact $e'$, and the field-contact $o^2$ is connected by a wire $o^7$ with the contact $f^3$.

$o^8$ is an insulated field switch-blade mounted on the pole-reversing lever H and adapted to connect the pair of field-contacts $o\ o'$ or the pair of field-contacts $o^2\ o^3$.

P represents a hand-switch whereby the lamps are turned on or off. This switch is provided with a centrally-pivoted switch-lever $p$, two lamp-contacts $p'\ p^2$ on one side of the switch-lever, and three dynamo-contacts $p^3\ p^4\ p^5$, arranged diametrically opposite the lamp-contacts. The contact $p^3$ is arranged between the contacts $p^4\ p^5$ and is connected by a wire $p^6$ with the binding-post $l^4$ on the resistance-board. The contact $p^3$ is also connected by interposed resistances $P'\ P^2$ with the contacts $p^4\ p^5$. The contacts $p'\ p^2$ are connected by wires $p^7\ p^8$ with one side of each of the groups of lamps, and the other side of the latter are connected by a wire $p^9$ with the opposite poles of both batteries. Upon turning the switch-lever $p$ so that one of its arms engages with the contact $p^3$ and its other arm with the contacts $p'\ p^2$, as shown in full lines in the drawing, the current from the wire $p^6$ is conducted to both sets of lamps. Upon turning this switch-lever so that it connects the contacts $p^2\ p^4$ the resistance $p'$ is placed in circuit with the lamps C' and the lamps C are cut out, while upon turning this switch-lever so as to connect the contacts $p'\ p^5$ the resistance $P^2$ is placed in circuit with the lamps C and the lamps C' are cut out. When these resistances are not provided and part of the lights are cut out (in this case half of the lights) the voltage of the current passing through the remaining lights increases perceptibly because the ampere load of the remaining lights is only part (in this case about one-half) of the total load, and consequently only about one-half of the current now passes through the main resistance to the lights, the remaining part of the current passing to the battery which is being charged. As the part of the current which now passes through the main resistance is considerably less than it was when all the lights were in circuit, the main resistance does not reduce the voltage as much as it did when all the lights were in circuit. The voltage at the remaining lights therefore increases accordingly, causing the lights to brighten up. In order to prevent this and maintain a steady illumination, whether all the lights or only part of the lights are in circuit, the resistances P' P² are employed. Each of these is in series with its part of the lighting-circuit and is so proportioned that it takes up the increase of voltage which would be produced by the cutting out of the remaining part of the lighting-circuit. The load is, however, not materially increased by these resistances beyond that which is due to the lights which remain in circuit, as these resistances are comparatively small and do not take the place of the lights which are cut out, but only absorb the excess of voltage which is not taken up by the main resistance. Upon turning the switch-lever so that it clears all of the contacts of the lamp-switch, as represented by dotted lines, both sets of lamps are cut out.

Q represents the board of a multiple hand-switch, which is so constructed that by shifting it either battery may be connected directly with the dynamo for charging the battery and the other battery may be connected with the lamps for supplying the same or the dynamo may be cut out and both batteries placed in parallel with the lamps. This hand-switch is provided with three sets or groups of contacts, which are arranged about the center of the switchboard, as shown in the drawing. Two of these groups of contacts are preferably arranged on diametrically-opposite sides of the switchboard and serve to connect the dynamo and batteries. One of the dynamo-battery sets of contacts consists of three pairs of contacts $q\ q'$, $r\ r'$, and $s\ s'$ and a single contact $t$, which is in line with the first-mentioned pair of contacts $q q'$. The other set of dynamo-battery contacts consists of three pairs of contacts $q^2\ q^3$, $r^2\ r^3$, and $s^2 s^3$ and a single contact $t'$, which is in line with the first-mentioned pair of contacts $q^2 q^3$. The third set of contacts consists of two pairs of emergency-contacts $u\ u'$ and $u^2 u^3$ and serves to connect the batteries in multiple with the lamps.

$q^4$ is a part of the main return or negative wire and connects the contacts $q'\ q^2$ of both the dynamo-battery sets with the binding-post $k$. This part of the negative wire preferably includes an ammeter $q^5$ for testing.

$q^6$ is another part of the main return or negative wire and connects the wire $p^9$ with the contacts $q^3$ and $q$. The binding-post $i$ at one end of the resistance is connected by a wire $s^4$ with the contacts $s$ and $s^3$. The binding-post $j$ at the opposite end of the resistance is connected by a wire $r^4$ with the contacts $r$ and $r^3$. The positive pole of the battery B is connected by a wire $v$ with the contacts $s^2$ and $r'$ and by a wire $v'$ with the contact $u^2$. The positive pole of the battery B' is connected by a wire $w$ with the contacts $r^2$ and $s'$ and by a wire $w'$ with the contact $u$. The contacts $u'$ and $u^3$ are connected with each other and are connected by a wire $u^4$ with the main lamp-wire $p^6$.

If desired, a voltmeter $u^5$ may be connected in a shunt across the lighting-circuit for testing and for determining the charged condition of the batteries.

$t^2$ represents a wire which connects the opposite end of the field-magnet coils Q with the contacts $t\ t'$.

The switch-lever X of the multiple hand-switch consists of three parallel switch-blades $x\ x'\ x^2$, which are insulated from each other and connected with the switchboard by a double hinge or universal joint, so that the lever can be turned circumferentially on the switchboard or parallel with the face thereof from one set of contacts to another and also can be swung toward and from the face of the switchboard for engaging the switch-blades with or disengaging the same from the contacts. This hinge-joint, as shown in the drawing, consists, preferably, of a supporting-head $x^3$, which is pivoted centrically on the switchboard and a cross-bar $x^4$, connecting the inner ends of the switch-blades and pivoted to the head $x^3$ at right angles to its central pivot. In the position of the switch-lever shown in the drawing the multiple switch-lever is turned, so that its blade $x$ connects the contacts $q\ q'$ and $t$, its blade $x'$ connects the contacts $r\ r'$, and its blade $x^2$ connects the contacts $s\ s'$.

When the multiple and lamp switches are in the position shown in the drawing and the dynamo is running at a normal speed in the direction of the arrow, the current generated by the dynamo is distributed as follows: Commencing at the brush $a$ the current passes successively through the wires $g$, contact $e$, blade $h$, contact $e'$, wire I to binding-post $i$, where the current divides. One part of the divided current passes from the binding-post $i$ through wires $s^4$, contact $s$, blade $x^2$, contact $s'$, wire $w$ to one side of the battery B' and charges the same. From the other side of battery B' the current continues through wire $p^9$, wire $q^6$, contact $q$, blade $x$, contact $q'$, wire $q^4$, including ammeter $q^5$, binding-post $k$, wire K, contact $e^3$, blade $h'$, contact $e^2$, and wires $g'$ to opposite brush $a'$, thus completing the charging-circuit of the battery B. The other part of the divided current passes from binding-post $i$ through the resistance binding-post $j$, wire J, contact $l^2$, reversing switch-lever L, pivot-post $l$, wire $l^3$, binding-post $l^4$, wire $p^6$, contact $p^3$, switch-lever $p$, two lamp-contacts $p'\ p^2$, wires $p^7\ p^8$, both sets of lamps, wire $p^9$ to wire $q^6$, where it joins the current from the charging-battery B' and returns with the current of the latter over the same course back to the dynamo, thus completing one of the dynamo-lighting circuits. The resistance is so proportioned that the pressure of the current after passing the resistance is somewhat less than the pressure of the previously-charged battery B, which causes this battery to discharge slightly, and the current so discharged passes from this battery through wire $v$, contact $r'$, blade $x'$, contact $r$, wire $r^4$ to binding-post $j$, where it joins the current from the dynamo which has passed the resistance, and hence passes with the same over the same course to the lamps and back to the opposite side of the battery B, thus completing one of the discharging-circuits of this battery. If the pressure of the dynamo-current after passing the resistance exceeds that of the charged battery B, the latter is charged by the excess current from the dynamo, thereby relieving the lamps from undue pressure and preventing the same from flickering. The current for exciting the field-coils passes from the brush $a$ through wires $g$, contact $e$, blade $h$, contact $e'$, wire $o^6$, contact $o$, field switch-blade $o^8$, contact $o'$, wire $o^4$, field-coils $o^5$, wire $t^2$, contact $t$, and blade $x$ to contact $q'$, where it meets the return-current from the lamps and battery B' and joins the same on the way back to the opposite brush $a'$, thereby completing one of the field-circuits.

If the car continues to run in the same direction and it becomes necessary to reverse the batteries by reason of the discharging-battery becoming exhausted, the multiple switch-lever is disengaged from the contacts $q\ q'\ t\ r\ r'\ s\ s'$ and turned into engagement with the opposite like set of contacts, so that its blade $x$ connects the contacts $s^2\ s^3$, its blade $x'$ connects the contacts $r^2\ r^3$, and its blade $x^2$ connects the contacts $t'\ q^2\ q^3$. In this position of the multiple switch-lever the current from the dynamo is distributed as follows: Commencing at brush $a$ the current passes through wires $g$, contact $e$, blade $h$, contact $e'$, wire I to binding-post $i$, where the current divides and one part passes through wire $s^4$, contact $s^3$, blade $x$, contact $s^2$, wire $v$ to one side of battery B and charges the same. From the opposite side of battery B the current passes along wire $p^9$, wire $q^6$, contact $q^3$, blade $x^2$, contact $q^2$, wire $q^4$, including the ammeter $q^5$, binding-post $k$, wire K, contact $e^3$, blade $h'$, contact $e^2$, and wires $g'$ to opposite brush $a'$. The other part of the divided current from the dynamo passes from binding-post $i$ through resistance, binding-post $j$, wire J, contact $l^2$, reversing switch-lever L, pivot-post $l$, wire $l^3$, binding-post $l^4$, wire $p^6$, contact $p^3$, switch-lever $p$, contacts $p'\ p^2$, wires $p^7\ p^8$, lamps C C', and wire $p^9$ to wire $q^6$, where it meets the return-current from the charging-battery B, and together these currents pass over the same way back to the opposite brush of the dynamo. The current discharging from battery B' passes through wire $w$, contact $r^2$, blade $x'$, contact $r^3$, wire $r^4$ to binding-post $j$, where it joins the dynamo-current which has passed the resistance on its way to the lamps and returns to the opposite side of the battery B'. Any excess current from the dynamo which the lamps do not take backs up from the binding-post $j$ and passes through wire $r^4$, contact $r^3$, blade $x'$, contact $r^2$, and wire $w$ into battery B' and increases the charge of the same. When the multiple switch is thus reversed, the current of the field-circuit passes from the wire $t^2$ to contact $t'$ and blade $x^2$ to contact $q^2$, where it joins the other currents returning to the opposite side of the dynamo.

When the movement of the car is reversed, the rotation of the dynamo is reversed, whereby the dynamo-contact lever H is turned in the opposite direction from that indicated by the arrow, and when running at a normal speed the blades $h\ h'$ connect the contacts $f\ f'$ and $f^2\ f^3$, the presser-arm M engages with the opposite arms of the resistance and battery-reversing levers L N and tilts these levers, so that the battery-reversing lever is disengaged from the contact $l^2$ and engaged with the contact $l'$, and the resistance switch-lever is turned in the opposite direction, so as to still break the circuit between the contacts $n^2\ n^3$, and the field switch-blade $o^8$ connects the contacts $o^2\ o^3$. When the parts are in this reversed position and the multiple and lamp switches are in the position shown in the drawing, the current from the dynamo is distributed as follows: Commencing at brush $a'$ the current passes successively through wires $g'$, contact $f^2$, blade $h'$, contact $f^3$, wire J to binding-post $j$, where the current divides, one part of the divided current passing from binding-post $j$ through wire $r^4$, contact $r$, blade $x'$, contact $r'$, and wire $v$ to and through battery B and charges the same. The current continues from the opposite side of battery B through wire $p^9$, wire $q^6$, contact $q$, blade $x$, contact $q'$, wire $q^4$, including the ammeter, binding-post, wire $k$, wire $k'$, contact $f'$, blade $h$, contact $f$, and wires $g$ to brush $a$. The other part of the divided current passes from binding-post $j$ through the resistance, binding-post $i$, wire I, contact $l'$, reversing-lever L, pivot-post $l$, wire $l^3$, binding-post $l^4$, and wire $p^6$ to and through the lamp-switch and lamps and back to the dynamo over the same course as the return-current of the charging-circuit of battery B. If the dynamo is putting out a normal current, battery B' is discharging slightly, and the current so discharged passes through wire $w$, contact $s'$, blade $x^2$, contact $s$, and wire $s^4$ to binding-post $i$, where this current joins the current from the dynamo and passes with the same to the lamp and returns to the opposite side of battery B'. If the multiple switch connects the contacts $t'$, $q^2\ q^3$, $r^2\ r^3$, and $s^2\ s^3$ while the dynamo is running in the opposite direction from that indicated by the arrow, the dynamo-current from wire $r^4$ passes from this wire through contact $r^3$, blade $x'$, contact $r^2$, and wire $w$ direct to battery B' and charges the same, and battery B normally discharges its current through wire $v$, contact $s^2$, blade $x$, contact $s^3$, and wire $s^4$ to binding-post $i$, where it meets the dynamo-current which has passed the resistance and passes with the same along wire I through the lighting-circuit to the lamps and back to the opposite side of battery B. While the dynamo is running in the direction opposite to that indicated by the arrow, the field-current passes from the brush $a'$ through wires $g'$, contact $f^2$, blade $h'$, contact $f^3$, wire $o^7$, contact $o^2$, field-blade $o^8$, contact $o^3$, and wire $o^4$ to and through field-coils and then back through the return path of the field-circuit to the opposite brush $a$, as before described.

When the multiple switch is in the position shown in the drawing and the dynamo goes out of action, while the pole-reversing lever H is in the position shown in the drawing, the lever H is withdrawn from the dynamo-switchboard, so as to disconnect all of the main and field contacts, and the presser-arm M is disengaged from the automatic battery-reversing switch-lever L and the resistance switch-lever N, which causes the latter to be turned by its spring $n'$, so as to connect the contacts $n^2 n^3$, whereby the dynamo is cut off from the lamps and the batteries are both placed in parallel with the lamps. In this position of the parts the current from battery B passes through wire $v$, contact $r'$, blade $x'$, contact $r$, wire $r^4$, binding-post $j$, wire J, contact $l^2$, reversing-lever L, pivot-post $l$, wire $l^3$, binding-post $l^4$, wire $p^6$ to and through lamp-switch and lamps to the opposite side of battery B. The current from battery B' passes through wire $w$, contact $s'$, blade $x^2$, contact $s$, wire $s^4$, binding-post $i$, wire I, contacts $l' n^2$, resistance-lever N, contact $n^3$, and wire $n^4$ to binding-post $j$, where it meets the current from battery B and passes with the same to and through lamps and then to the opposite side of battery B'. Upon reversing the multiple switch, so that it engages with contacts $t'$, $q^2 q^3$, $r^2 r^3$, and $s^2 s^3$, while the dynamo is out of action and the dynamo-contact lever is in the position shown in the drawing, the dynamo and resistance $d$ are cut out and both batteries placed in parallel with the lamp, the current of both batteries in this position of the parts uniting at the contact $l'$ on their way to the lamps. If the dynamo goes out of action when the pole-reversing lever H stands in the position opposite to that shown in the drawing, the dynamo and the resistance $d$ are cut out, and both batteries are placed in parallel and their currents meet at contact $l'$ on their way to the lamps if the multiple switch engages either the set of contacts $t$, $q q'$, $r r'$, $s s'$ or the set of contacts $t'$, $q^2 q^3$, $r^2 r^3$, $s^2 s^3$.

If for any reason the dynamo gets out of order, it is cut off from the lamps and the batteries by shifting the multiple switch so that its blade $x^2$ connects the contacts $u u'$ and its blade $x$ connects the contacts $u^3 u^3$. When the multiple switch is in this position, the current from the battery B passes through the branch wire $v'$, contact $u^2$, blade $x$, contact $u^3$, wire $u^4$, wire $p^6$, contact $p^3$, lamp-switch lever $p$, lamp-contacts $p' p^2$ to and through lamps and then back by wire $p^9$ to the opposite side of battery B. The current from battery B' passes through branch wire $w'$, contact $u$, blade $x^2$, contact $u'$, wire $u^4$, wire $p^6$, contact $p^3$, switch-lever $p$, contacts $p' p^2$ to and through the lamps and then back by wire $p^9$ to opposite side of battery B'. In this position of the multiple switch-lever its center blade $x'$ is not used and its side blades $x$ $x^2$ connect the like terminals of both batteries with the wire $n^4$, leading to one side of the lamps, without including the resistance $d$. When the multiple switch-lever connects the contacts $u u' u^2 u^3$, the field-contacts $t t'$ are disconnected from the main return or negative line, so that the circuit through the field-coils is positively broken or cut out.

The field-contacts $t t'$ are so constructed that upon opening the multiple switch-lever its blades first leave the dynamo-battery contacts and then leave the field-contacts, while upon closing the switch-lever its blades first engage the field-contacts and then the dynamo-battery contacts, whereby the field-coils are always energized when the armature-circuit is closed. This opposes any tendency to short-circuit the batteries through the armature, which otherwise might occur and which would result in burning out the latter.

When the multiple switch is shifted from the main or dynamo-battery contacts to the battery-lamp contacts, the connection between the dynamo and batteries is wholly cut off and the batteries are coupled in parallel with the lamps, thereby permitting of utilizing the batteries for lighting the lamps if the dynamo gets out of order, and also preventing the batteries from being accidentally short-circuited through the dynamo and exhausted. While shifting the multiple switch-lever from the dynamo-battery contacts to the battery-lamp contacts the circuit through the field-coils is also broken. This prevents the field-coils from becoming energized if the dynamo resumes generation when cut off from the batteries. If the field-circuit were left closed while the dynamo is cut off from the batteries, the field would be closed directly across the armature, and if the dynamo generates a current by reason of the residual magnetism in the dynamo-frame while the circuits are in this condition the field magnetism would be liable to build up to a dangerous point and raise the voltage sufficiently above the normal to cause the field-coils to be burned out.

I claim as my invention—

1. The combination with the generating-circuit, the lighting-circuit and two storage batteries, of a multiple hand-switch having two sets of main contacts interposed between the generating-circuit on one hand and the batteries and the lighting-circuit on the other hand, a set of emergency contacts interposed between the batteries and the lighting-circuit, and a switch-lever adapted to connect either a set of main contacts or the emergency contacts, each set of main contacts having two contacts arranged in the generating-circuit for opening or closing the same and having also a group of battery-alternating contacts, whereby, upon shifting the switch-lever from one set of main contacts to the other, the generating-circuit is alternately connected with one battery and the other battery with the lighting-circuit, while upon engaging the switch-lever with the emergency contacts the generating-circuit is opened and both batteries are connected in multiple with the lighting-circuit, substantially as set forth.

2. The combination with the generating-circuit, the field-circuit, the battery-circuit and the lighting-circuit, of a multiple hand-switch having main contacts interposed between the generating-circuit and the battery and lighting circuits for opening or closing the generating-circuit, emergency contacts interposed between the battery-circuit and the lighting-circuit, field-contacts arranged in the field-circuit for opening or closing the same, and a switch-lever adapted to be engaged with or disengaged from the main contacts and the field-contacts for closing or opening the field-circuit when the generating-circuit is closed or opened, or to be engaged with the emergency contacts for opening the generating-circuit and field-circuit and connecting the battery-circuit with the lighting-circuit, substantially as set forth.

3. The combination with the lighting-circuit and the supplying-circuit, of an interposed hand-switch having lamp-contacts and a supplying-contact, a resistance-contact connected with the supplying-contact by a resistance, and a switch-lever by which the supplying-contact can be connected at will with said lamp-contacts to supply the lighting-circuit, or by which the resistance-contact can be connected with one of the lamp-contacts to supply part of the lighting-circuit, thereby placing the resistance in series with the part of the lighting-circuit which is connected with the resistance-contact by the switch-lever, substantially as set forth.

Witness my hand this 14th day of November, 1899.

RUFUS N. CHAMBERLAIN.

Witnesses:
   JNO. J. BONNER,
   CLAUDIA M. BENTLEY.